United States Patent [19]
Whiteford

[11] Patent Number: 5,564,793
[45] Date of Patent: Oct. 15, 1996

[54] WHEEL AND METHOD OF FORMING SAME

[76] Inventor: Michael B. Whiteford, Lot2 Anton Road, Luddenham, NSW 2745, Australia

[21] Appl. No.: 246,251

[22] Filed: May 18, 1994

[30] Foreign Application Priority Data

| May 20, 1993 | [AU] | Australia | PL8910 |
| May 31, 1993 | [AU] | Australia | PL9113 |
| Aug. 11, 1993 | [AU] | Australia | 44579/93 |

[51] Int. Cl.⁶ .................................................. B60B 5/02
[52] U.S. Cl. ........................ 301/64.7; 301/64.1; 301/104
[58] Field of Search ................................ 301/64.1, 64.2, 301/64.3, 64.7, 104, 95, 96, 97, 98

[56] References Cited

U.S. PATENT DOCUMENTS

| 3,807,474 | 4/1974 | Wendt et al. | 301/64.7 X |
| 4,252,378 | 2/1981 | DeBolt et al. | 301/64.7 X |
| 4,919,491 | 4/1990 | Hopkins et al. | 301/104 X |
| 5,133,591 | 7/1992 | Skaggs et al. | 301/64.7 X |
| 5,415,463 | 5/1995 | Olson et al. | 301/64.7 |

FOREIGN PATENT DOCUMENTS

| 160694 | 6/1989 | Japan | 301/64.7 |

*Primary Examiner*—Russell D. Stormer
*Attorney, Agent, or Firm*—Abelman, Frayne & Schwab

[57] ABSTRACT

An integrally formed plastic cycle wheel has an inner hollow core formed of a first plastics material, the core having a central portion and outwardly extending and spaced apart spoke portions; an outer layer of a second plastics material is moulded over said core and extends out into a circumferentially recessed rim of the wheel.

18 Claims, 10 Drawing Sheets

WHEEL AND METHOD OF FORMING SAME

BACKGROUND OF THE PRESENT INVENTION

This invention relates to a wheel such as for example a wheel to be used with a cycle such as a bicycle, mountain bike or the like. The invention also relates to a method of forming such a wheel. While the invention is described and referred to by way of example only, with reference to a wheel for use with bicycles, mountain bikes and the like, it should be appreciated that the invention can be used in connection with wheels for other forms of transport.

Over the years, various forms of cycle wheels have been known and used. In particular, various attempts have been made to provide a satisfactory wheel for use with cycles, which is light-weight, strong and airodynamically sound. The various wheels known up until this time have not been satisfactory, in that they have been of insufficient strength and have not had sufficient airodynamic qualities.

Methods of forming wheels known up until this time have often been expensive and time consuming and have not always resulted in commercially and operationally satisfactory wheels.

It is an object of one aspect of this invention to provide a cycle wheel which goes at least some way towards overcoming or minimizing the problems outlined above.

It is an object of a further aspect of this invention to provide a method of forming a cycle wheel which goes at least some way towards overcoming or minimizing the problems outlined above.

It is an object of at least one aspect of this invention to provide a straightforward and efficient cycle wheel.

It is an object of at least one aspect of the present invention to provide a straightforward and efficient method of forming a cycle wheel.

Other objects of this invention will become apparent from the following description.

SUMMARY OF THE PRESENT INVENTION

According to one aspect of this invention there is provided a wheel having a central portion with spaced apart spokes extending outwardly and radially therefrom into a circumferentially extending recessed rim, said wheel having an inner hollow core of a first plastics material with a second plastics material being molded or overlaid over said inner hollow core.

According to a further aspect of this invention there is provided a wheel having a substantially hollow inner core of a first plastics material, overlaid or molded with a second plastics material, so that said wheel has a plurality of spaced apart spokes extending outwardly and radially of a substantially medial portion, into an annular and circumferentially extending recessed rim portion and wherein said second plastics material is more flexible than said first plastics material.

According to a further aspect of this invention there is provided a cycle wheel having a central portion with spaced apart spokes extending outwardly and radially therefrom into a circumferentially extending recessed rim; said wheel having an inner hollow core with a substantially central portion and spaced apart outwardly and radially extending axle portions; an outer layer of a second plastics material being moulded over said core and extending outwardly thereof, so as to define said circumferentially extending recessed rim of said wheel.

According to a further aspect of this invention there is provided a cycle wheel having a central portion with spaced apart spokes extending outwardly and radially therefrom into a circumferentially extending recessed rim; said wheel having an inner hollow core with a substantially central portion and spaced apart outwardly and radially extending axle portions; an outer layer of a second plastics material being molded or laid over said core and extending outwardly thereof to define said circumferentially extending recessed rim of said wheel; wherein the plastics material of the inner core has a specific gravity greater than the plastics material of the outer layer.

According to a further aspect of this invention there is provided an integrally formed plastic cycle wheel, having a substantially central portion with spaced apart spokes extending outwardly and radially therefrom into a circumferentially extending recessed rim; a bore extending through said substantially central portion; said wheel having an inner hollow core having a substantially central portion with spaced apart and outwardly and radially extending spoke portions formed of a first plastics material; an outer layer of a second plastics material being molded and/or overlaid over said inner core and extending outwardly thereof to define said circumferentially extending recessed rim portion; wherein said inner core is substantially hollow and is formed by the attachment of at least two molded hollow core portions; and wherein the inner core of said first plastics material has a specific gravity greater than the outer layer and said recessed rim, formed of said second plastics material.

According to a further aspect of this invention there is provided a cycle wheel formed of a plastics material having a substantially central portion with spaced apart spokes extending outwardly and radially therefrom, so as to extend into and provide a circumferentially extending recessed rim, a strengthening and reinforcing clip being provided and located within said recessed rim, so as to strengthen said recessed rim and support and assist tire location within said recessed rim.

According to a further aspect of this invention there is provided a cycle wheel formed of a plastics material having a substantially central portion and a plurality of integrally formed and spaced apart spokes extending outwardly and radially therefrom, so as to extend into an integrally formed and substantially circumferentially extending recessed rim portion; metal clip means being provided for insertion into said recessed rim; said clip means having a substantially central body portion of a substantially "U" configuration, with upper sides thereof extending outwardly and downwardly into spaced apart side arms; said substantially central "U" shaped portion being adapted to be located within the recessed rim of said wheel with the spaced apart and downwardly extending side arms being located and extending over outer sides of the plastics material of said recessed rim of said wheel.

According to a further aspect of this invention there is provided a method of forming a plastic cycle wheel including:

(a) forming an inner hollow core of a first plastics material each having a hub and a plurality of spaced apart and radially extending spoke portions, and (b) molding or laying a second plastics material over said core and so as to extend outwardly thereof such as to form a circumferentially extending recessed rim.

According to a further aspect of this invention there is provided a method of forming a plastic cycle wheel including:
(a) forming an inner hollow core of a first plastics material by connecting together two recessed side portions, each having a central hub portion and a plurality of spaced apart and radially extending spoke portions; and
(b) molding or laying a second plastics material over said core and so as to extend outwardly thereof such as to form a circumferentially extending recessed rim.

According to a further aspect of this invention there is provided a method of forming a plastic cycle wheel including:
(a) forming an inner hollow core of a first plastics material having a substantially central portion with a bore extending therethrough and a plurality of spaced apart radially extending spoke portions by connecting together two recessed core side portions, each having a recessed hub and a plurality of spaced apart and radially extending spoke portions;
(b) holding said core in a predetermined or desired position in a mold/die; and
(c) molding or overlaying a second plastics material over said core and so that said second plastics material extends outwardly so as to form a circumferentially extending recessed rim to said wheel.

According to a further aspect of this invention there is provided a method of forming a plastics wheel including:
(a) forming an inner hollow core of a first plastics material having a substantially central bore extending therethrough by connecting together two recessed core side portions, each having a recessed hub and a plurality of recessed, spaced apart and radially extending spoke portions;
(b) holding said core in a predetermined or desired position in a mold/die by inserting a mandrel into said bore in said core and by engaging inwardly extending lugs in said bore within recesses in said mandrel and by releasably locating one or more lugs in said mold/die, into one or more recesses provided in ends of one or more spoke portions of said core;
(c) moulding or overlaying a second plastics material over said core and said spoke portions in said mold/die, such that said second plastics material extends outwardly into, so as to form, a circumferentially extending recessed rim of said wheel, and
(d) removing said mandrel from said bore and said mold/die and said lugs from said recess(es).

BRIEF DESCRIPTION OF THE ACCOMPANYING DRAWINGS

This invention will be described by way of example only and with reference to the accompanying drawings wherein:

FIG. 1 is a perspective view of a wheel according to one form of the present invention, FIG. 2 is a partially sectional side view of a wheel according to one form of the present invention, FIG. 3a is a sectional view of a wheel along lines 3a—3a of FIG. 2 of the drawings, FIG. 3b is a sectional view along line 3b—3b of FIG. 2 of the accompanying drawings according to one form of the present invention, FIG. 3c is a sectional view along line 3c—3c of FIG. 2 of the accompanying drawings according to one form of the present invention, FIG. 3d is a sectional view along lines 3d—3d of FIG. 2 of the accompanying drawings, FIG. 4 is an end view of a wheel according to one form of the present invention and as shown in FIGS. 1, 2 and 3 of the accompanying drawings, FIG. 5 is a perspective view of a wheel according to a further form of the present invention, FIG. 6 is a partially sectional side view of a wheel as shown in FIG. 5 of the accompanying drawings, FIG. 7a is a sectional view of the wheel along lines 7a—7a as shown in FIG. 6 of the accompanying drawings, FIG. 7b is a sectional view along lines 7c—7c of FIG. 6 of the accompanying drawings according to one form of the present invention, FIG. 7c is a sectional view along lines 7c—7c of the wheel shown in FIG. 6 of the accompanying drawings according to one form of the present invention, FIG. 7d is a sectional view along lines 7d—7d of a wheel as shown in FIG. 6 of the accompanying drawings, FIG. 8 is a side view of a wheel according to one form of the present invention and as shown in FIGS. 5, 6 and 7 of the accompanying drawings, FIG. 9 is an exploded view of the present invention showing side core portions used in the construction of the core of the wheel according to one form of the present invention, and FIG. 10 is a view of a complete core according to a further form of the present invention.

DETAILED DESCRIPTION OF THE PRESENT INVENTION

Figure 1:
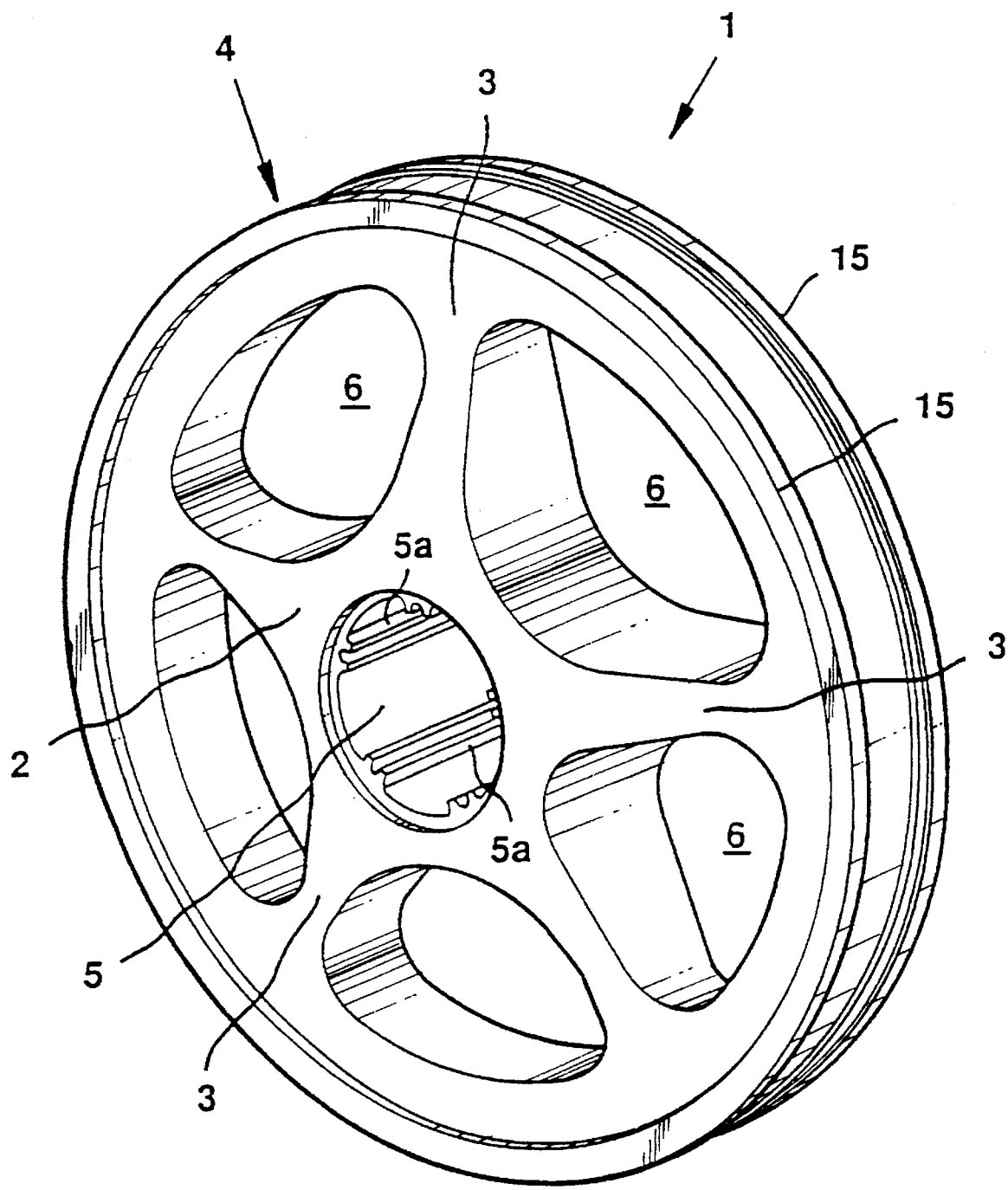
Figure 2:
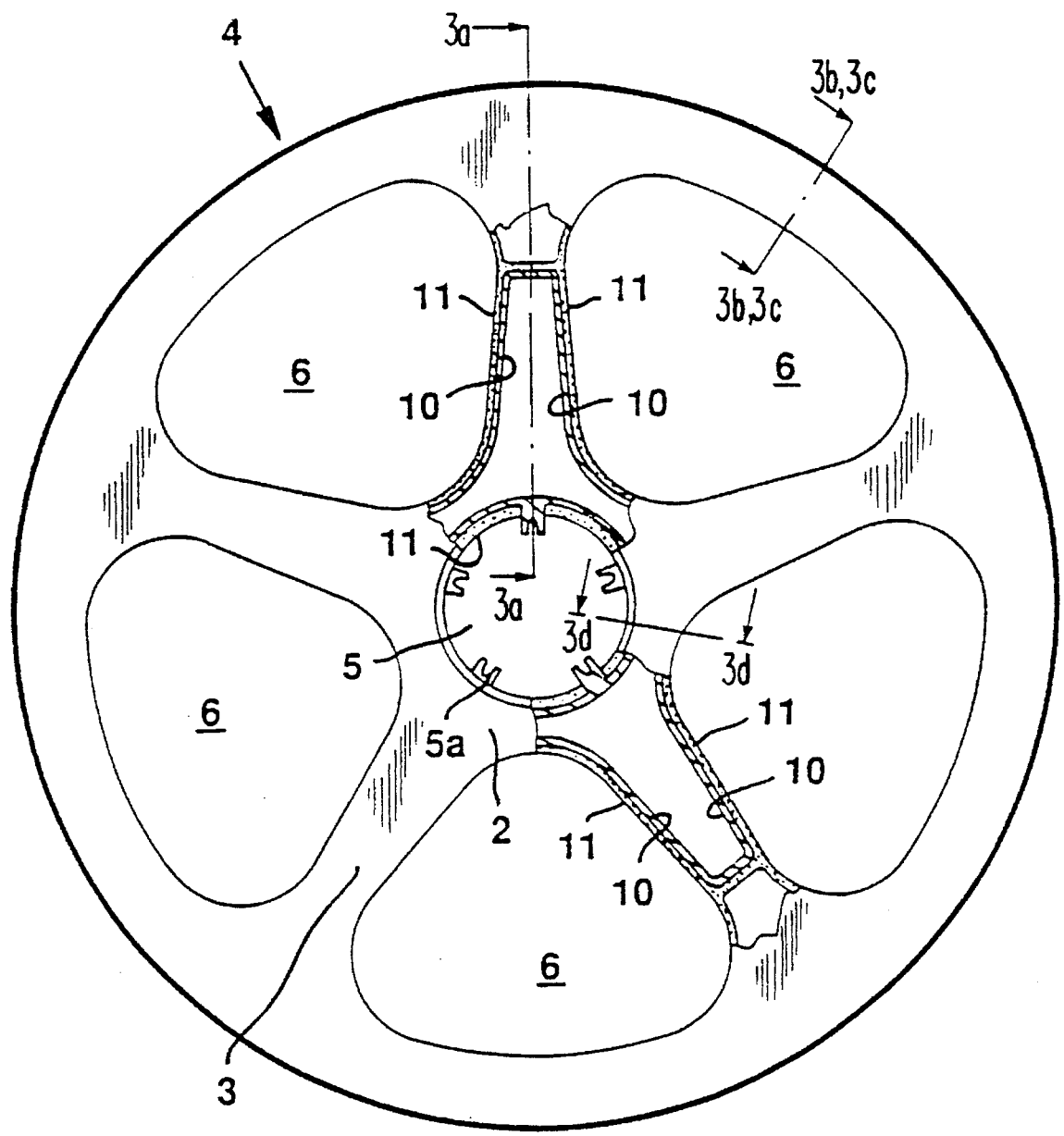

This invention will be described by way of example only and with reference to the accompanying drawings. The present invention relates to a wheel for use primarily as a cycle wheel and which wheel is constructed of a plastics material so as to be light-weight, strong and airodynamically sound. The present invention sets out to provide such a plastics wheel, which is attractive and esthetically pleasing, but at the same time is sufficiently airodynamically sound and strong as to meet the demands of the cycling industry and people involved in and associated with the sport of cycling. As indicated above, plastic cycle wheels previously disclosed and methods of forming cycle wheels previously disclosed have had numerous problems associated therewith. It is however believed that the present invention which provides a plastic cycle wheel and a method of forming same provides both a method and wheel that are commercially and operationally effective and sound.

In one preferred form, the present invention provides a cycle wheel formed by a method which provides a substantially central and hollow core of a first plastics material. This hollow central core formed of a first plastics material, has a central portion with a bore extending therethrough and extends outwardly into spaced apart and outwardly and radially extending spoke portions. The core is formed by connecting together substantially hollow side core portions, and the core so formed has a bore extending therethrough. This core is preferably placed in a mold and is held in position within a mould or die. A second plastics material is then molded or overlaid over the core and so as to extend outwardly of the hollow spoke portions, to form a substantially circumferentially extending recessed rim.

In order to provide a sufficiently strong and airodynamically satisfactory wheel, the inner core is formed of a different plastics material from the outer layer and rim.

It is preferred that the inner core be formed of a polyester plastics material, such as a reinforced engineering plastics material, and that this be harder and stronger than the plastic forming the outer layer and rim (which will be described hereinafter). In particular, the inner core has properties of tensile strength, a resistance to moisture absorption and a minimal (low to zero) creep factor.

In a preferred form of the invention the inner core has greater strength and less flexibility than the outer layer and rim, and for example has a specific gravity in the range of approximately 1.09–1.80. In a preferred form of the invention the specific gravity of the material forming the core is approximately 1.51.

By way of example only, an appropriate material that could be used for formation of the inner core, is a polymer plastics material available under the trade mark RYNITE.

The plastics material used for the outer layer and in forming the rim, is a more flexible material while also being a nylon plastics material and preferably has a specific gravity in the range of for example 1.05–1.50. In a preferred form of the invention the outer layer or coating may have a specific gravity of approximately 1.18.

Preferably, the plastics materials are fiber-reinforced plastics materials.

By way of example only, an appropriate material that could be used in the formation of the outer layer, is a plastics material known under the trade mark ZYTEL.

It should be appreciated however that these materials are by way of example only. It is however important that the plastics materials be of appropriate strength so that the plastics material of the inner core is harder and stronger than the more flexible plastics material of the outer layer and rim. Preferably the plastics materials are fiber-reinforced materials, and it has been found that by having the plastics materials of different strength, a particularly effective plastics wheel is provided.

It has also been found in experimentation that the provision of a plastic wheel such as that described herein sometimes requires that the recessed rim be provided with some form of strengthening and reinforcing to locate tires. To this end, and as will be further described with reference to the drawings, clip means are provided for location within the recessed rim and the recessed rim is provided and formed with shoulder means to allow for the engagement of such reinforcing clips. Preferably the clips are manufactured of a metal material such as aluminium, and the insertion thereof serves to strengthen the recessed rim and to allow for the straightforward location, engagement and retaining of tires within the rim.

In a further form of the invention which will also be further described with reference to the accompanying drawings, a reinforcing clip of a metal material is provided which is formed with spaced apart side portions which engage over outer side surfaces of the plastic side of the rim. It should be appreciated that there have been problems associated with plastic wheels previously, where outer peripheral surfaces thereof are used as bearing surfaces for brake pads. In many cases the materials normally available and used for cycle brake pads are not always compatible with plastics materials, so that when such brake pads come into contact with plastics materials, there is not always as effective a braking action as might be desired. In certain cases, materials have been developed to facilitate an efficient and essentially plastic to plastic contact. However, these materials and brake pads are not always available and can in any event be expensive to manufacture and use. Many of the materials developed and used as cycle brake pads are developed for contact with a metal bearing surface, given that the peripheral rims of many cycle wheels have been and still are manufactured of a metal material.

Thus, by using a reinforcing clip member with outwardly and downwardly extending side members, such a clip is engaged within the recessed rim of the wheel and the metal side members extend downwardly on either side of the upper sides of the plastic rim. Both the clip and/or rim can be profiled and/or provided with shoulders and the like to enable a secure engagement to result. However, it should be appreciated that the location and engagement of such a clip within the rim of a wheel allows for a metal side portion which acts as a braking or bearing surface for brake pads normally used with cycle wheels. It has been further found that such metal or aluminium side members on outer peripheral sides of the rim of such plastic wheels can be colored and/or anodized and the like so that the rims can have varying or differing colored surfaces about the rims which can be esthetically pleasing and an added feature of such plastic wheels.

The invention will now be described in detail, with specific reference to the accompanying drawings.

The present invention provides a straightforward and efficient method of forming an integral plastic wheel 1, preferably for use as a cycle wheel. The wheel 1 as shown in the accompanying drawings has a substantially central portion 2 with a bore 5 extending therethrough and a plurality of spokes 3 which are spaced apart one from the other to provide a spacing 6 therebetween, the spokes 3 extending outwardly and radially from the central portion 2 and extending into, so as to form, an annular and circumferentially extending recessed rim portion 4. In the accompanying drawings, FIGS. 1, 2, 3 and 4 essentially show views of a wheel for use as a front wheel of a cycle, whereas FIGS. 5, 6, 7 and 8 show views of a wheel for use as a rear wheel of a cycle.

The bore 5 of the wheel shown in the accompanying drawings preferably be provided with a plurality of elongate, spaced apart and inwardly extending recessed lugs 5a. These lugs 5a in essence have a dual purpose. Once formed, the lugs 5a provide recesses to enable location of end caps over the bores. During the manufacturing method of the present invention (as to be described hereinafter) the lugs 5a allow for a core of the wheel to be held in a mold/die. This will be described hereinafter in more detail.

In the method of the present invention (and with particular reference to FIGS. 2, 3a, 6, 7a, 9 and 10 of the drawings) a wheel 1 is formed by first forming an inner hollow core 80 of a first plastics material, such as a first plastics material hereinbefore referred to. This is however by way of example only. Preferably however, the plastics material is a reinforced plastics material. Preferably, the plastics material which forms the core is a harder and stronger material than the more flexible second plastics material used to form the outer surface and rim of the wheel (as hereinafter described).

The inner hollow core 80 of the wheel 1 is preferably formed by connecting or attaching together two substantially recessed or hollow side portions 40, each of which includes a central portion 41 and outwardly extending recessed spoke portions 42, the spoke portions 42 being spaced apart one from the other, so as to have an essentially "starfish" like configuration. On the inner surface thereof, an inwardly extending throat 45 extends inwardly, the inwardly extending throat having spaced apart recessed lugs 5a on the inner surface thereof, the throat portions 45 in due course, and following connection of the throat portions 45, forming the bore 5 of the wheel 1. Two such integrally molded and formed side portions 40 are then secured together by appropriate means to form a hollow core 80 having a central portion 81 with outwardly extending spaced apart spoke portions 82 which form butt spoke portions. Lower and adjacent sides of the side portions which are to engage one with the other, can be provided with respective lips and recesses or can be provided with pins or lugs to bring about an appropriate engagement therebetween. Alternatively, if desired, the side portions can be secured together by bonding, adhesive, heat sealing, ultrasonic welding, or the like. It is however important that the side portions be secured together so as to form a hollow core for the wheel. The throat portions are aligning with each other to form the bore extending through the core of the wheel.

Figure 9:
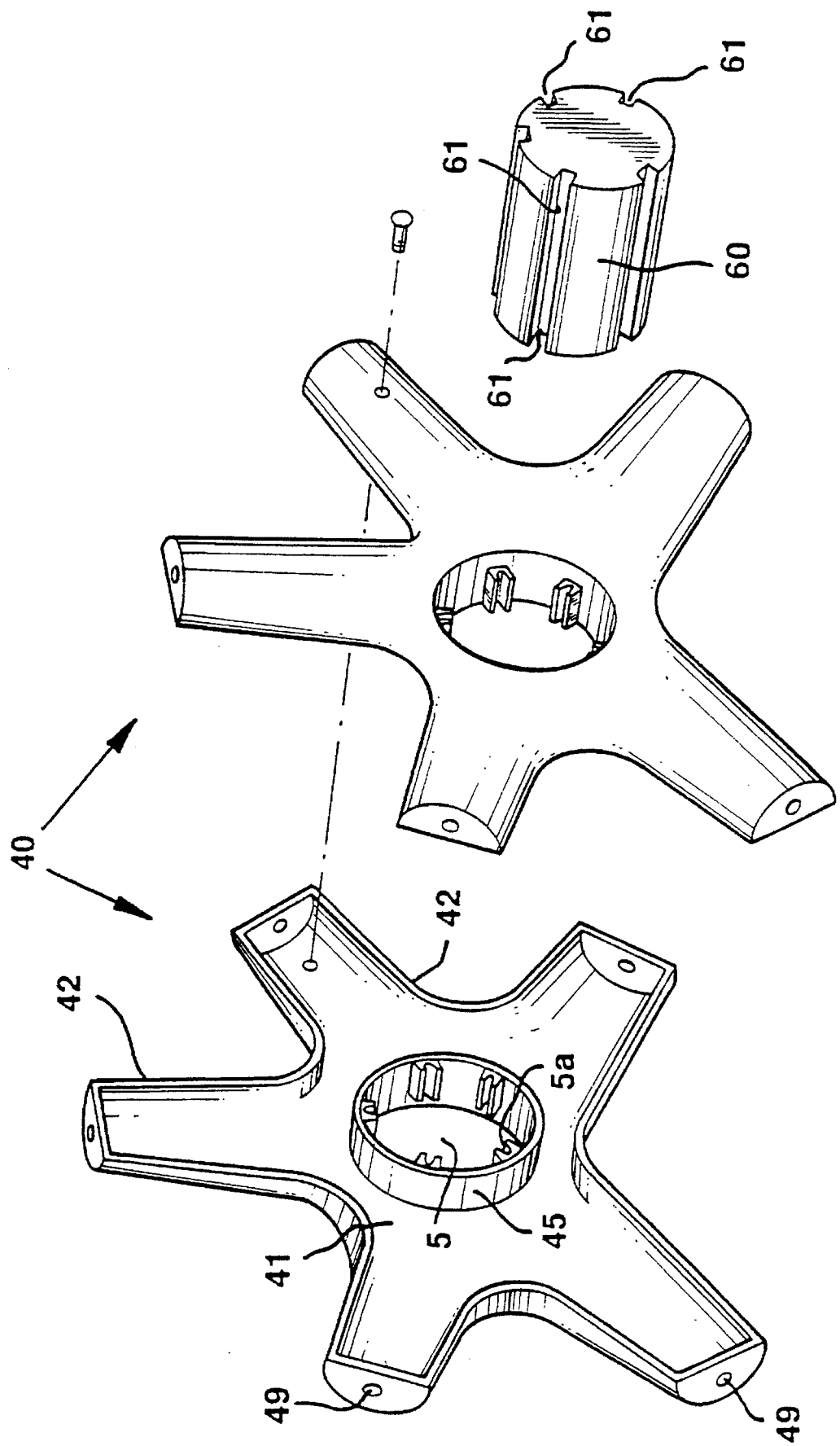
Figure 10:
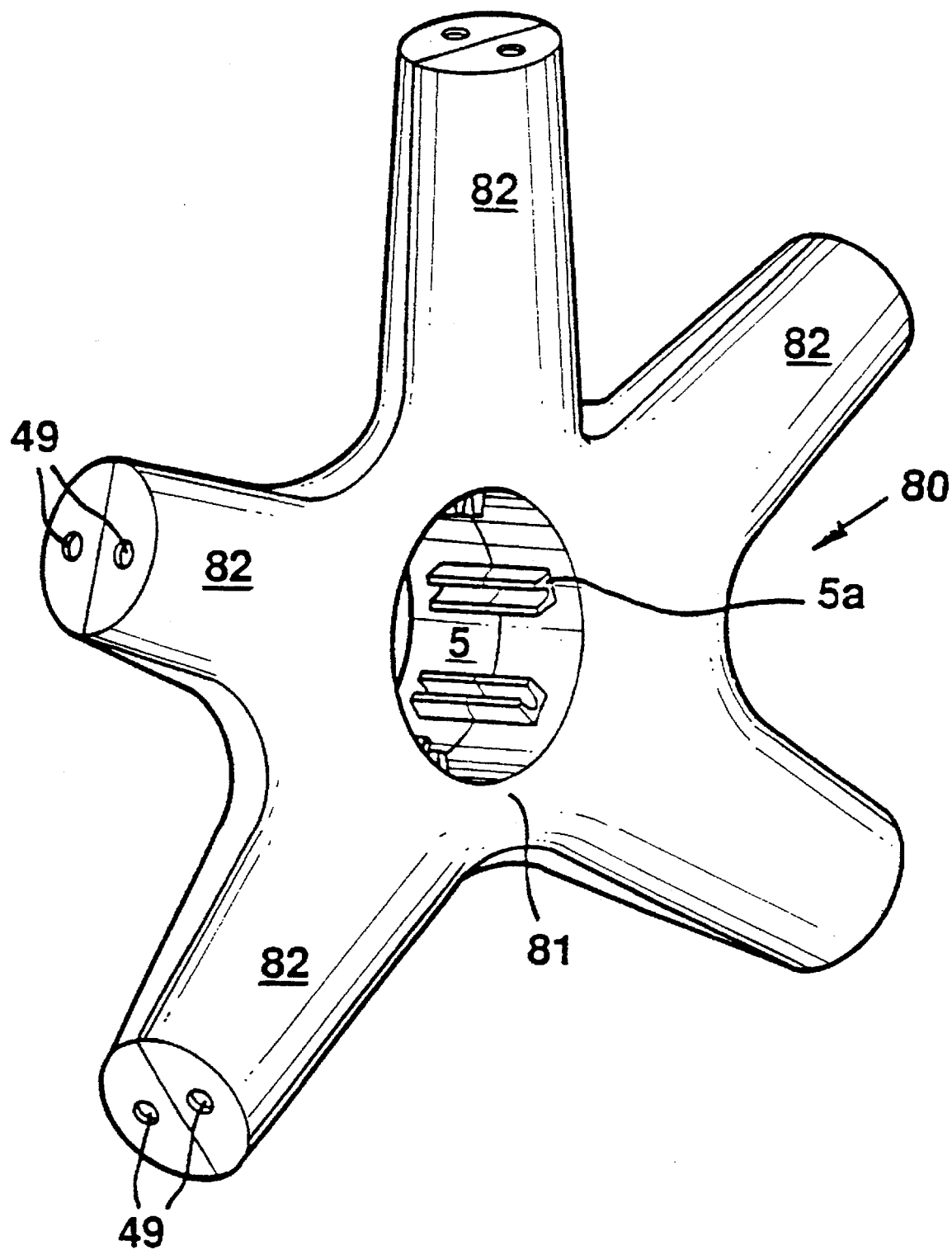

In certain forms of the invention and as shown by way of example only in FIGS. 9 and 10 of the accompanying drawings, ends of the spoke portions 42 of each side portion are provided with a recess 49 which will enable lugs associated with a die means to hold the core 80 in position in a mold or die, when the core is being held in such a mold or die during the molding or overlaying of a second plastics material (as will be hereinafter described).

It should be appreciated that the side portions 40 of the core can be molded or formed in any appropriate manner. When connected together, they define a hollow core 80 for the wheel.

The method of the invention then involves holding the core of a first plastics material 10 in an appropriate die or mold, and applying by appropriate molding means or injecting molding an outer layer of a second reinforced plastics material 11 over the core 60 and outwardly into, so as to form, an outer circumferentially extending and recessed rim portion 4 (as shown in the accompanying drawings). In a preferred form of the invention and in order to hold the core 80 in position and maintain it in a sealed and closed state, a mandrel 60 (FIG. 9) can be provided such as shown in FIG. 9 of the accompanying drawings, the mandrel 60 being provided with elongate grooves 61 running the length thereof. The mandrel 60 can then be located within the bore 5 of the core 80, by having the lugs 5a engage within the recesses 61 in the mandrel 60. This then assists in locating the core 80 in position within the mold or die. Further, the holes or recesses 49 in the ends of the arms or butt spoke portions 42 of the core allow for securing means, lugs or pins, in association with movable die or mold members, to engage therewith and hold the core together and prevent separation, during the molding or overlaying of the second plastics material over the core.

While in the preferred form of the invention, the core 80 is formed from two side portions 40, the core may be formed or molded as a unitary formed hollow core 80, if desired.

As described hereinbefore, the second plastics material 11 is preferably a reinforced plastics material but is a more flexible plastics material than the harder material of the core.

The second plastics material 11 is preferably molded over the core and in the mold extends outwardly beyond the stub spoke portions 82 to form the circumferentially extending recessed rim 4 of the wheel. Preferably, during the molding, the second plastics material 11 also extends through the bore 5, so as to extend completely about the core 80 and reinforce the join between the side portions of the core.

When the molding is complete and curing completed, the mandrel and die lugs are withdrawn, allowing withdrawal of the core.

As discussed hereinbefore, the plastics material of the core 80 is harder than the plastics material of the outer layer 11 and rim 4.

In one form of the invention and by way of example only, the inner core and inner core side portions have a thickness for example of between approximately 1 mm–2.5 mm. In a preferred form of the invention and by way of example only, the thickness of the second layer of plastics material extending out into the circumferential peripheral rim of the wheel has a thickness of between approximately 1.5 mm and approximately 3.5 mm.

The wheel 1 formed by the method of the present invention has been found to be particularly advantageous in that it is airodynamically sound, particularly strong and provides substantial advantages over the wheels known up until this time.

Figure 5:
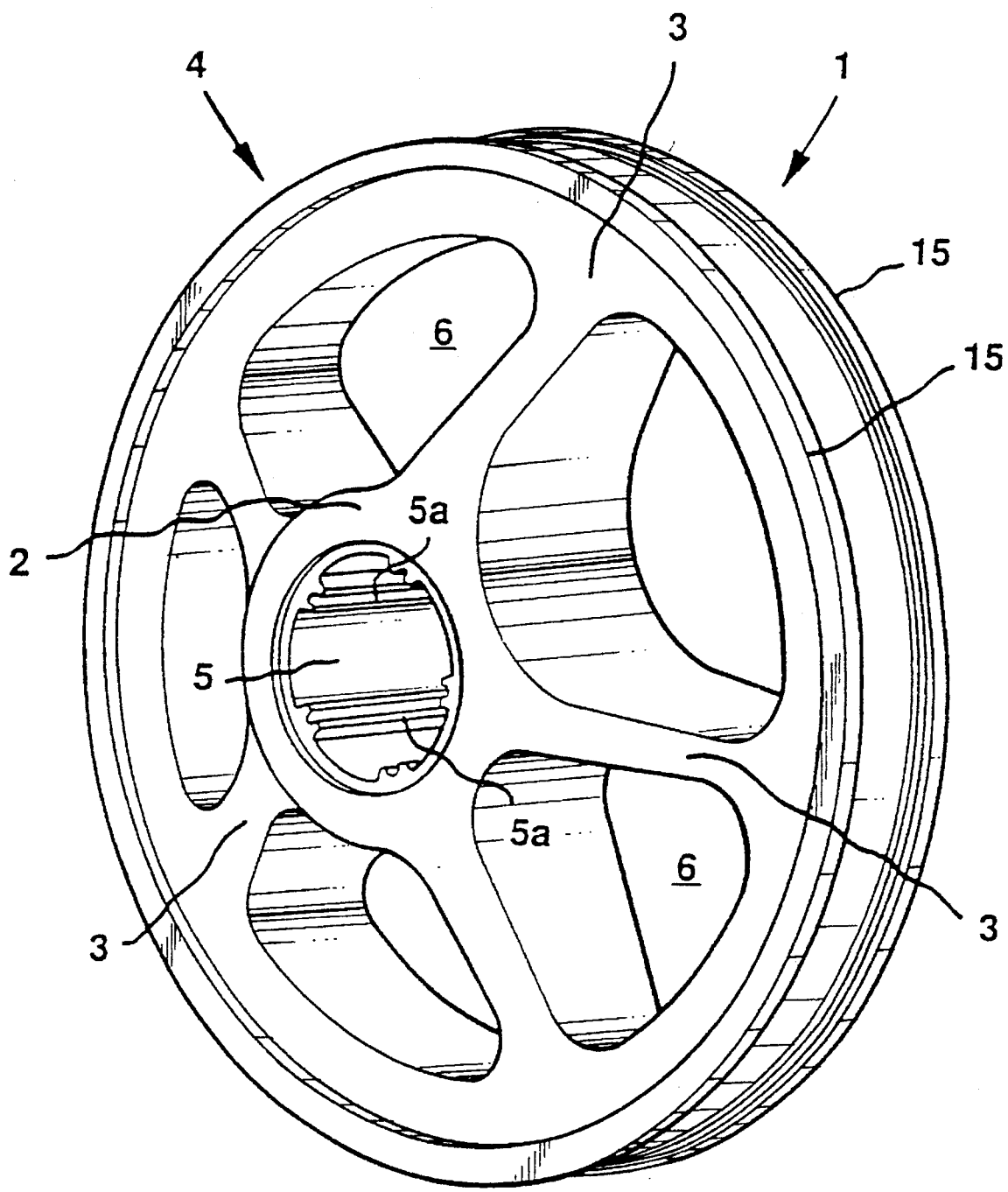
Figure 6:
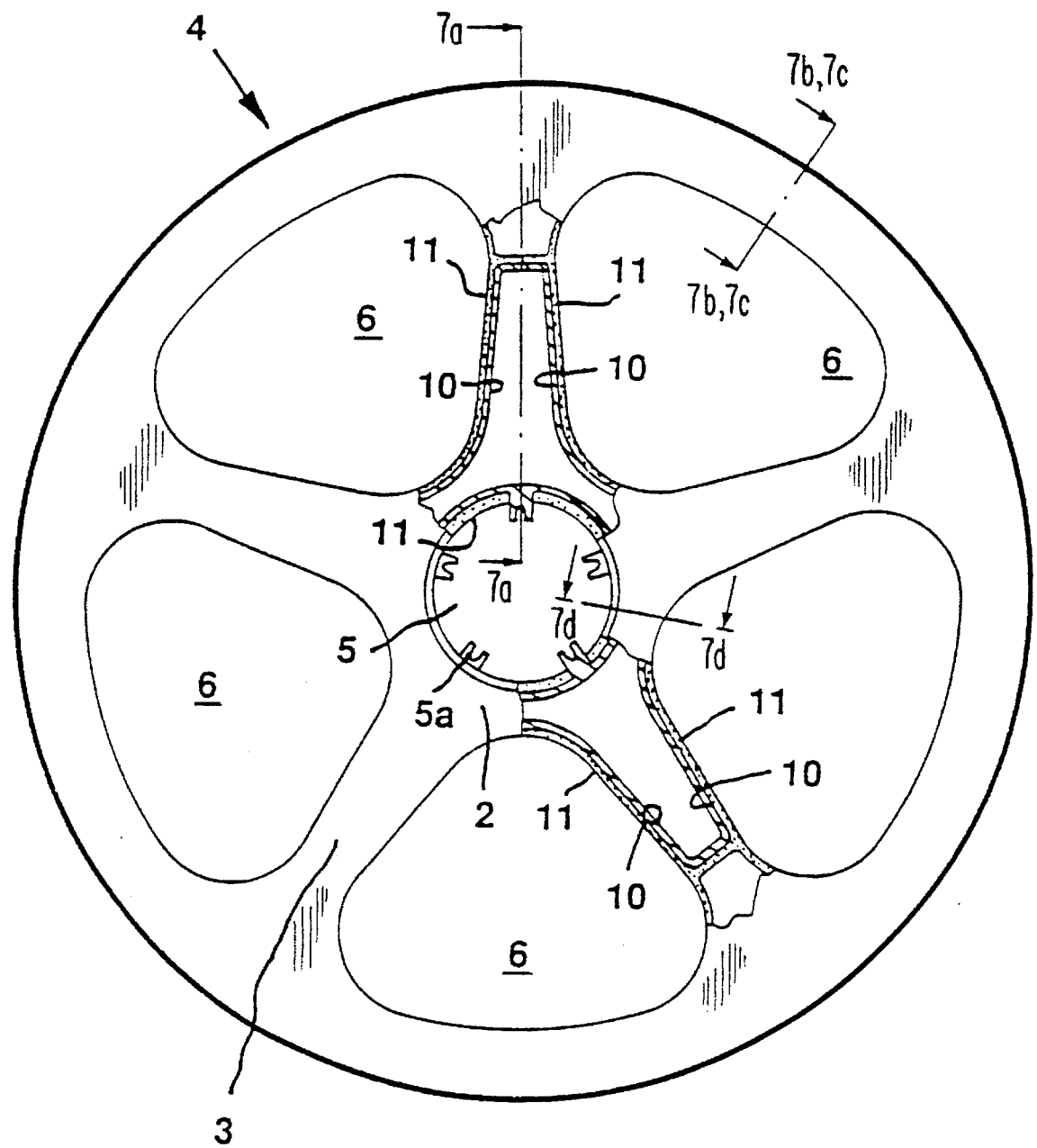

Further, the wheels 1 and in particular rear wheels are of sufficient strength as to hold appropriate gear clusters, axles and the like, in a straightforward and efficient manner, without such location affecting the strength and airodynamic qualities of the wheel. Referring to FIGS. 1 and 5 of the accompanying drawings, the recessed lugs 5a allow for the location of end caps (not shown) to the wheels in order to close same or to provide esthetic appeal, should this be desired. Such caps can be provided with members such as engagement members which engage within and relative to the recessed lugs, in a releasable manner.

Referring further to the accompanying drawings, and more particularly to FIGS. 3 and 7, the present invention provides means whereby the circumferentially extending recessed rim 4 can be strengthened to assist in the location of tires within the rim.

In a first form of the invention and with reference to FIGS. 3a, 3c, 7a and 7c of the accompanying drawings, inner upper side surfaces of an upper portion 15 of the rim 4 are provided with steps or shoulders 26 and are profiled, so as to allow for the engagement of a reinforcing clip 20 therewithin. For example, the inner side surfaces at or adjacent the ends of the circumferential recess 4 can be provided with shoulders 26 such as shown in the accompanying drawings, and a clip 20, such as a metal clip, can be correspondingly profiled (as at 27) so as to engage with the shoulders 26 within the recess. Preferably the clip 20 is of a substantially "U" shaped body portion 25 with profiled arm portions 27 which engage with the configuration 26 of the recessed rim 4. Preferably the clip 20 is of a sprung metal or aluminium material, which strengthens the rim 4 and assists in the location of a tire.

Figure 3A:
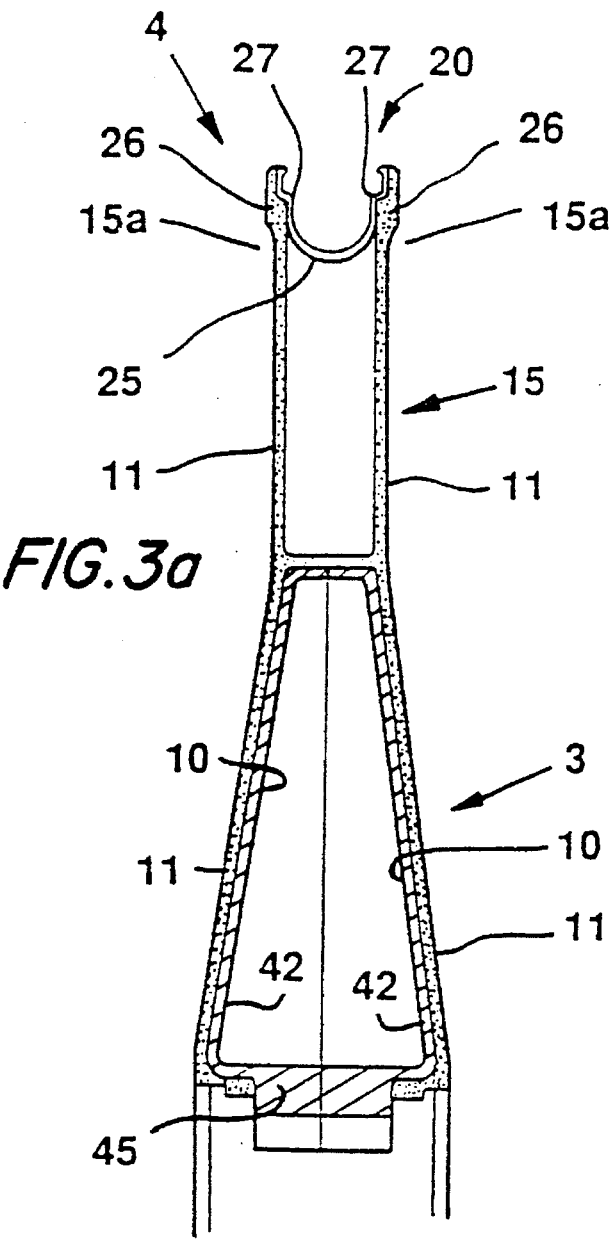
Figures 3B, 3C, 3D:
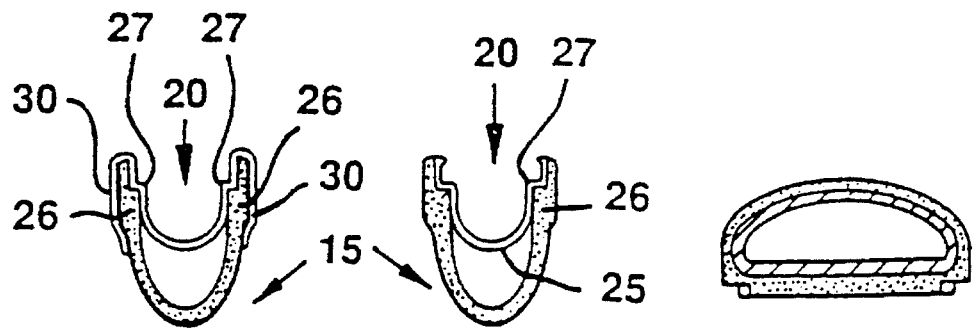
Figure 4:
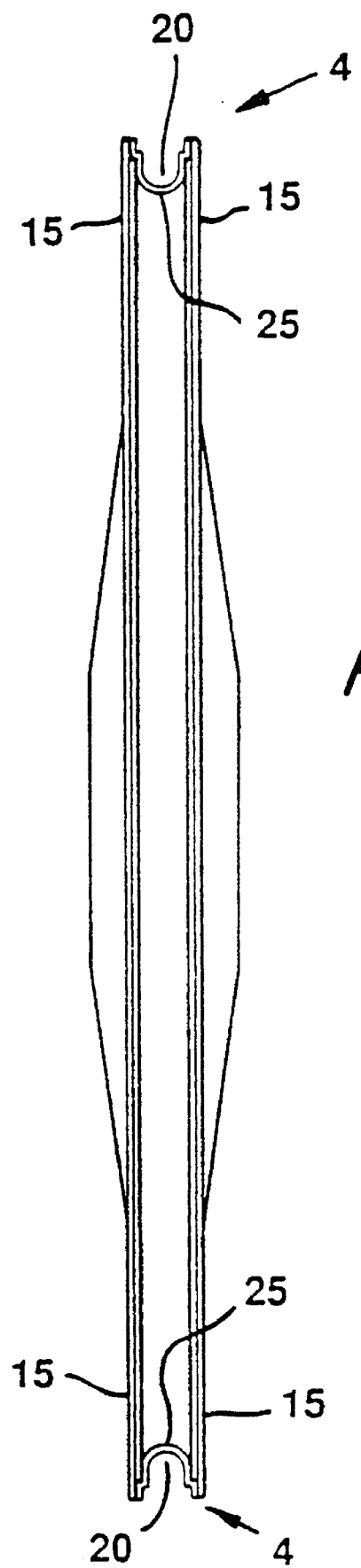
Figure 7A:
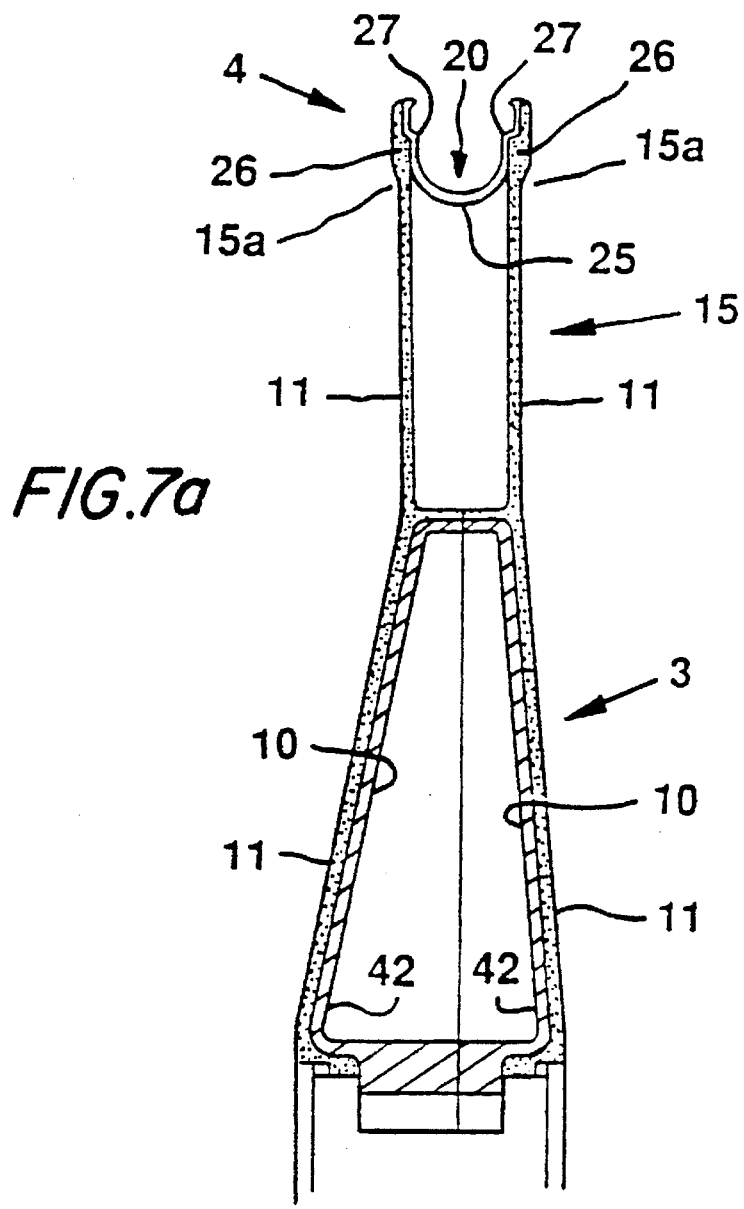
Figures 7B, 7C, 7D:
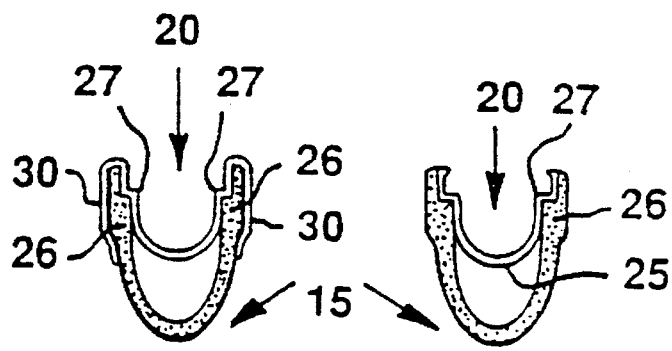
Figure 8:
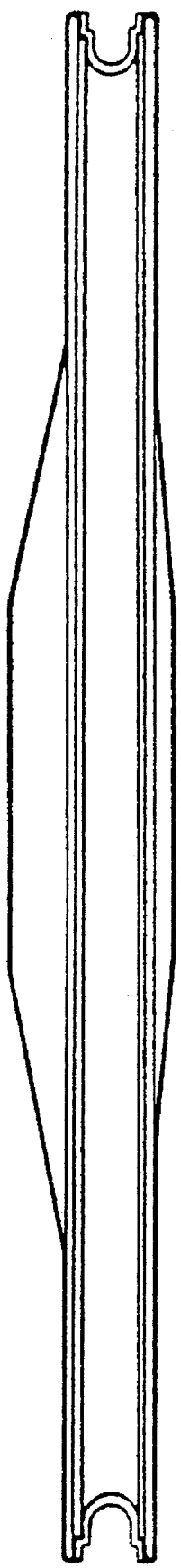

In a further form of the invention as shown in FIGS. 3b and 7b of the accompanying drawings, the substantially "U" shaped clip 20 has upwardly extending arms which extend outwardly and then downwardly into downwardly extending spaced apart side arms 30, so that the "U" shaped portion 25 of the clip 20 can be located within the recessed rim, with the spaced apart and downwardly extending side arms 30 extending over the top of the rim and down the outer sides thereof. This then provides a metal surface on the outer side surfaces of the rim 4. As discussed hereinbefore, this provides a metal braking surface for braking pads which are effective or more effective against metal as against plastic. The metal surface can also be coloured or anodized for esthetic purposes. It has been found that such clips are particularly advantageous.

Such clips can be constructed of any appropriate metal material, such as spun metal, aluminium or the like.

It has been found that the integral plastic wheel 1 of the present invention provides substantial advantages over known plastic wheels and it has also been found that such a method of forming plastic wheel as that described hereinbefore, has substantial advantages over methods known and used up until this time.

This invention has been described by way of example only and modifications and improvements may be made without departing from the scope or spirit thereof, as defined by the appended claims.

I claim:

1. A plastic cycle wheel, having a central portion with spaced apart spokes extending outwardly and radially therefrom into a circumferentially extending recessed rim, said wheel having an inner hollow core of a first plastics material with a second plastics material being molded, over said inner hollow core.

2. A cycle wheel as claimed in claim 1, having a substantially hollow inner core of a first plastics material overlaid by a second plastics material so that said wheel has a plurality of spaced apart spokes extending outwardly and radially of a substantially medial portion, into an annular and circumferentially extending recessed rim portion and wherein said second plastics material is more flexible than said first plastics material.

3. A method of forming the plastic cycle wheel of claim 1 including:
  (a) forming an inner hollow core of a first plastics material by connecting together two recessed side portions, each having a hub and a plurality of spaced apart and radially extending spoke portions; and
  (b) molding a second plastics material over said core and so as to extend outwardly thereof such as to form an integral, and circumferentially extending, recessed rim of said wheel.

4. A method as claimed in claim 3, wherein the side portions are each provided with engagement means to enable interengagement of said side portions one with the other.

5. A method as claimed in claim 3, wherein said side portions are sealed or bonded one to the other.

6. A method as claimed in claim 3, wherein a mandrel is inserted into a bore in said core, said mandrel being provided with spaced apart recesses which engage with spaced apart lugs on an internal surface of said bore so as to assist in holding said core in position during molding of the outer layer of said second plastics material.

7. A method as claimed in claim 3, wherein engagement means in a mold engage within recesses provided in one or more ends of one or more spoke portions of said side portions, to hold said side portions together during the molding of said second plastics material.

8. A method of forming the plastic cycle wheel of claim 1 including:
  (a) forming an inner hollow core of a first plastics material having a substantially central portion with a bore extending therethrough and a plurality of spaced apart radially extending spoke portions by connecting together two recessed core side portions, each having a recessed hub and a plurality of spaced apart and radially extending spoke portions;
  (b) holding said core in a predetermined or desired position in a mold; and
  (c) molding a second plastics material over said core and so that said second plastics material extends outwardly so as to form a circumferentially extending recessed rim to said wheel.

9. A method of forming the plastic cycle wheel of claim 1 including:
  (a) forming an inner hollow core of a first plastics material having a substantially central bore extending therethrough by connecting together two core side portions, each having a recessed hub and a plurality of recessed, spaced apart and radially extending spoke portions, one or more recesses being provided in one or more ends of one or more of the spoke portions;
  (b) holding said core in a predetermined or desired position in a mold by inserting a mandrel into said bore in said core, said mandrel having recesses therein, and by engaging inwardly extending lugs in said bore within said recesses in said mandrel and by engaging one or more lugs in said mold into said one or more recesses in said one or more ends of said one or more of the spoke portions;
  (c) molding a second plastics material over said core and said spoke portions in said mold, such that said second plastics material extends outwardly thereof, so as to form, a circumferentially extending recessed rim of said wheel, and
  (d) removing said mandrel and said mold and lug(s) from said recess(es).

10. A cycle wheel as claimed in claim 1, wherein a bore extends through a central portion of said wheel, said bore being provided with inwardly extending and spaced apart securing lugs.

11. A cycle wheel as claimed in claim 1, wherein the inner core of a first plastics material has a specific gravity greater than the outer layer of second plastics material.

12. A cycle wheel as claimed in claim 1, wherein a metal clip of a substantially "U" shaped configuration is located within the circumferential recess of said wheel, sides of said recess, and said clip, being so formed and profiled as to allow for engagement therebetween.

13. A cycle wheel as claimed in claim 1, wherein a metal clip is provided for engagement within the circumferential recess of said wheel; said clip being of a substantially "U" shaped configuration; sides thereof extending outwardly and downwardly into spaced apart downwardly extending side arms on either side thereof; the arrangement being such that a "U" shaped body of said clip is able to be located within the circumferential recess of said wheel, with the downwardly and spaced apart side arms extending downwardly on outer sides of the rim of said plastic wheel, at or adjacent the recess, to provide outer metal surfaces on either side of said plastic rim.

14. A method of forming the plastic cycle wheel of claim 1 including:
  (a) forming an inner hollow core of a first plastics material so that said core has a substantially central portion with spoke portions extending outwardly and radially therefrom, and
  (b) moulding a second plastics material over said core and so as to extend outwardly thereof, such as to form an integral and circumferentially extending, recessed rim of said wheel.

15. A method as claimed in claim 14, wherein said first plastics material has a specific gravity greater than the second plastics material.

16. A plastic cycle wheel having a central portion with spaced apart spokes extending outwardly and radially therefrom into a circumferentially extending recessed rim; said wheel having an inner hollow core with a substantially central portion and spaced apart outwardly and radially extending spoke portions; an outer layer of a second plastics material being molded over said core and extending outwardly thereof to define said circumferentially extending recessed rim of said wheel.

17. A plastic cycle wheel having a central portion with spaced apart spokes extending outwardly and radially therefrom into a circumferentially extending recessed rim; said wheel having an inner hollow core with a substantially central portion and spaced apart outwardly and radially extending spoke portions; an outer layer of a second plastics material being molded said core and extending outwardly thereof to define said circumferentially extending recessed rim of said wheel; wherein the plastics material of the inner core has a specific gravity greater than the plastics material of the outer layer.

18. An integrally formed plastic wheel, having a substantially central portion with spaced apart spokes extending outwardly and radially therefrom into a circumferentially extending recessed rim; a bore extending through said substantially central portion; said wheel having an inner hollow core having a substantially central portion with spaced apart and outwardly and radially extending spoke portions, formed of a first plastics material; an outer layer of a second plastics material being molded over said inner core and extending outwardly thereof to define said circumferentially extending recessed rim portion; wherein said inner core is substantially hollow and is formed by the attachment of at least two molded hollow core portions; and wherein the inner core of said first plastics material has a specific gravity greater than the outer layer and the recessed rim.

* * * * *